No. 822,260. PATENTED JUNE 5, 1906.
W. L. R. EMMET.
POWER GENERATING APPARATUS.
APPLICATION FILED OCT. 7, 1905.
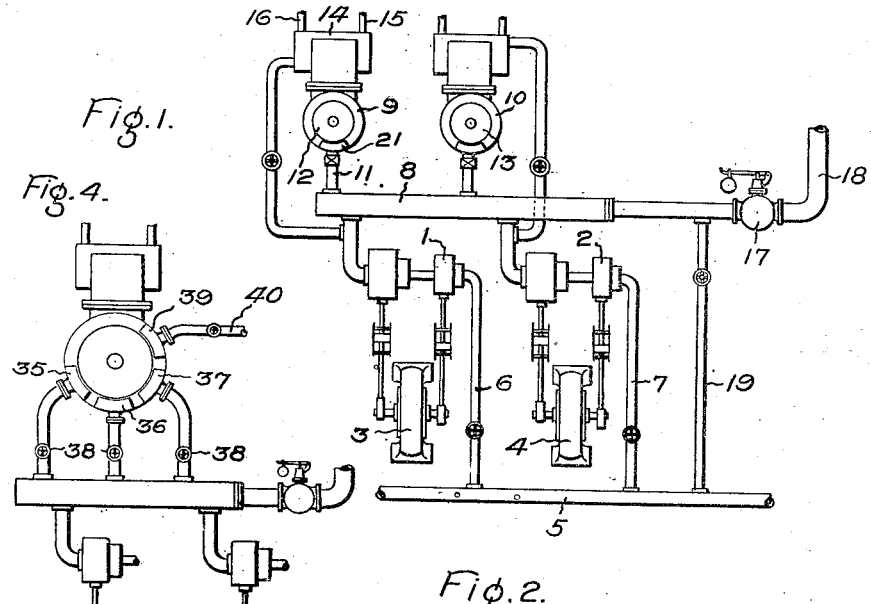
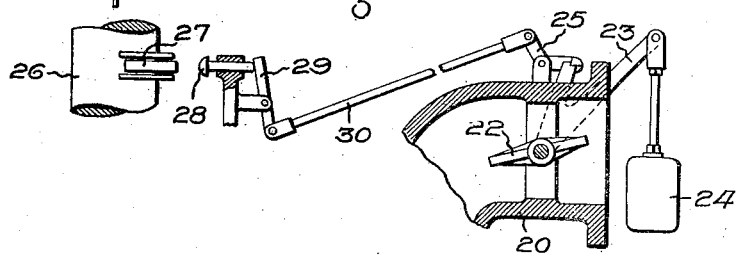
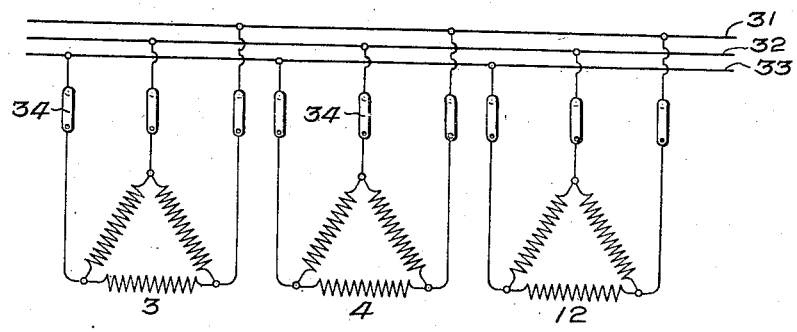
Witnesses:
Inventor:
William L. R. Emmet,
by Albert G. Davis,
Att'y.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

POWER-GENERATING APPARATUS.

No. 822,260.     Specification of Letters Patent.     Patented June 5, 1906.

Application filed October 7, 1905. Serial No. 281,786.

*To all whom it may concern:*

Be it known that I, WILLIAM L. R. EMMET, a citizen of the United States, residing at Schenectady, county of Schenectady, State of New York, have invented certain new and useful Improvements in Power-Generating Apparatus, of which the following is a specification.

The present invention has for its object to improve the economy of operation of power plants that include high-pressure reciprocating engines.

At the present time there are in operation a large number of power plants equipped with reciprocating steam-engines, some of which operate condensing and others noncondensing. In the former case the economy is greater than in the latter; but in neither case is it as great as it should be. The greatest restriction of possible economy in the reciprocating engine lies in the limited range of the expansion of the steam supplied thereto. On the other hand, the steam-turbine possesses the inherent advantage that it can be designed to work effectively with very high degrees of expansion of the steam.

In carrying out my invention I take advantage of this peculiarity of the steam-turbine and connect one or more of them to the exhaust-conduit of one or more reciprocating engines, the latter being arranged to work between the boiler and a suitable exhaust-pressure. For example, this may be atmosphere or somewhat above or below it.

In plants using compound reciprocating engines it is desirable to arrange the turbine to take steam from the engines under full-load conditions at about eight pounds absolute, corresponding approximately to the exhaust-point in the low-pressure cylinder of the engine. The engine will then handle all the steam which it can with maximum efficiency, and its output will only be slightly reduced. The turbine will handle the steam to which the engine is not well adapted.

Whatever the pressure may be, the turbine or turbines are designed to extract the available energy between it and that of the final exhaust. A separate condenser may be provided for each turbine, or two or more may discharge into the same condenser.

Between the reciprocating engine and the turbine is situated a header of suitable capacity which acts as a reservoir and at the same time prevents the puffs of steam due to the intermittent exhaust from passing as such directly to the turbine. To the header or other suitable point is connected a conduit that exhausts into the atmosphere. In this conduit is an automatic relief-valve that opens when the pressure in the header exceeds the predetermined amount and closes when the pressure falls below the said amount. Between the header and the original source of supply is a valved conduit by means of which high-pressure steam may be admitted to the header and the turbines when for any reason the load on the latter exceeds a certain amount. Ordinarily the valve in this conduit is closed.

In starting the reciprocating engines it is sometimes desirable to obtain the benefit of the condenser, and in order to do this a valved by-pass connection is provided which shunts the turbines. Each reciprocating engine may have its own conduit, or they may be connected to a conduit that is common thereto.

The turbines may with advantage be employed to drive electric generators of the alternating-current type, and when these generators are connected in parallel with another source which is suitably controlled the latter will maintain the speed of the turbine constant or approximately so, and admission-valves for the turbines may be dispensed with. When generators are employed which are not so connected, valve mechanism may be employed.

In order to protect the turbine-driven generators and prevent them from racing in event of a circuit being interrupted or from any other cause, an emergency-governor is mounted on the shaft of each or is driven thereby, which governor upon a definite increase in speed trips a suitable device that causes a shut-off valve between the header and the turbine to close.

The reciprocating engines may be provided with any suitable governor.

A turbine designed for operation under the conditions above specified is exceedingly simple, and its maintenance and care add little or nothing to the cost of station operation. In certain stations furnishing electric current the introduction of the arrangement described with proper condensing facilities will increase the output as much as thirty per cent. without any increase of the fuel consumption or change in the boiler plant.

In the accompanying drawings, which illustrate one embodiment of my invention, Figure 1 is a plan view of a power plant comprising high-pressure reciprocating engines and low-pressure turbines. Fig. 2 is a detail view of one of the emergency or shut-off valves between the header and the low-pressure turbines. Fig. 3 is a diagram illustrating the circuit connections of the generators, and Fig. 4 is a slight modification wherein the supply to the turbine can be subdivided.

1 and 2 represent compound reciprocating engines arranged to drive electric generators 3 and 4. Steam or other elastic fluid under high pressure is supplied to the engines from the main 5 through the conduits 6 and 7. The exhaust from the reciprocating engines passes into the header 8, and the latter supplies it to the vertical shaft-turbines 9 and 10 of the Curtis type through the conduits 11. The header consists of a conduit or tank containing a relatively large chamber, to which steam is admitted in puffs and discharged as a continuous or practically continuous stream. Each of the conduits 11 is provided with a valve, as shown in Fig. 2, which will hereinafter be described. Mounted either above or below the turbines are suitable alternating-current generators 12 and 13, that are driven by the main shafts of the turbines. Each turbine is connected to a condenser 14 of suitable construction. As illustrated, these condensers are of the ordinary surface type. 15 represents the pipe for conveying the cooling-water to the condenser, and 16 the discharge-pipe.

The header 8 is provided with an automatic relief-valve 17, which when the pressure therein exceeds a predetermined amount opens and permits steam to escape to the conduit 18. When the pressure decreases below a predetermined point, the valve automatically closes.

It sometimes happens that the load on the turbine exceeds that which can be handled by the exhaust-steam from the reciprocating engine. Under these conditions live steam from the main 5 is supplied to the header 8 by the valved conduit 19. Under normal conditions this conduit is closed. The arrangement shown in Fig. 4 may, however, be employed. Instead of taking steam from the main 5 it may be taken from a point between the high and low pressure cylinders of the reciprocating engines.

In Fig. 2 is shown the detailed construction of the shut-off valve between the header and each of the turbines. 20 represents the conduit which supplies steam to the steam-chest 21, Fig. 1, and mounted in the conduit is a butterfly-valve 22, which is mounted on a suitable spindle. To one end of the spindle is connected an arm 23, which has a weight 24 suspended from its outer end. The arm and valve are normally retained in the position shown by means of the pivotally-supported latch 25. This latch normally prevents the valve from closing.

The apparatus for releasing the latch will now be described. 26 represents the main shaft of a turbine, and mounted thereon and arranged to move outwardly under a predetermined increase in speed—say, for example, ten per cent.—is a weight 27. Situated in the path of the weight and adapted to be struck thereby when the speed increases to a certain point is a reciprocating pin 28 or other device that engages with the lever 29, the latter being connected by the rod 30 with the latch 25. Obviously when the pin 28 is moved longitudinally to the right it will cause the rod 30 to be moved to the left, thus tripping the valve and allowing it to be closed under the action of the weight 24. When it is desired to shut off a turbine from the header, the latch 25 may be actuated by hand and the weight permitted to close the valve. The valve may be reset by raising the weight by hand until the latch 25 reëngages the arm.

In Fig. 3 I have shown diagrammatically three generators 3, 4, and 12, connected to bus-bars 31, 32, and 33. The generators may be of any suitable construction. The circuits between the generators and the bus-bars are provided with switches 34, by means of which the circuits can be interrupted. When the generators are of the alternating-current type, those driven by the turbines will be kept in synchronism with those driven by the reciprocating engines. The engines are provided with any suitable governing mechanism to maintain the necessary speed. When the turbines are employed to drive alternators connected in parallel, I may dispense with governing mechanism therefor. On the other hand, I may employ governing mechanism and arrange the turbines to drive either alternating or direct current generators.

In Fig. 4 is shown a turbine of the Curtis or other type having separate steam-chests 35, 36, and 37, each of which is connected separately to the header 8. In each of the connections is a valve 38, usually hand-operated, whereby the passage of steam may be controlled. A steam-chest 39 is also provided, and connected thereto is a valve-controlled conduit 40, the latter receiving steam from the high-pressure main 5 for overload conditions. When the turbine is of the Curtis or other jet type, the expansion ratio of the nozzle or nozzles supplied by the high-pressure steam would be somewhat greater than that of the nozzles supplied by exhaust steam from the header.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In combination, one or more high-pressure reciprocating engines, a header receiving the exhaust therefrom, one or more low-pressure turbines receiving energy from the header, a relief-valve discharging from the header to a suitable exhaust, and a conduit for admitting high-pressure fluid to the turbine for overload conditions of service.

2. In combination, one or more high-pressure reciprocating engines, a header receiving the exhaust therefrom, one or more low-pressure turbines receiving energy from the header, and a condenser into which the turbines exhaust, in combination with a by-pass connection by which the reciprocating engine or engines can be started as condensing units.

3. In combination, one or more high-pressure reciprocating engines, a header receiving exhaust therefrom, one or more low-pressure turbines receiving energy from the header, and a conduit for admitting high-pressure fluid to the turbine or turbines for overload conditions.

4. In combination, one or more high-pressure reciprocating engines, a header receiving exhaust therefrom, a relief-valve therefor, one or more low-pressure turbines receiving energy from the header, one or more condensers into which the turbines exhaust, a conduit admitting high-pressure fluid to the header for heavy-load conditions on the turbines, and a conduit for connecting one or more of the reciprocating engines to the condensing apparatus for the purpose of starting.

5. In combination, one or more reciprocating engines, a header receiving the exhaust therefrom, one or more low-pressure turbines receiving energy from the header, electric generators for the engines and turbines, which are connected in parallel to synchronize the speeds of the reciprocating engines and turbines, and an automatic valve which controls the pressure of fluid in the header.

6. In combination, one or more reciprocating engines, a header receiving the exhaust therefrom, one or more low-pressure turbines receiving energy from the header, electric generators for the engines and turbines, which are connected in parallel to synchronize the speeds of the reciprocating engines and turbines, and a conduit for admitting high-pressure fluid to the turbine or turbines for heavy load conditions.

7. In combination, one or more reciprocating engines, a header receiving the exhaust therefrom, one or more low-pressure turbines receiving energy from the header, electric generators for the engines and turbines, an automatic relief-valve for controlling the pressure in the header, and a conduit for admitting high-pressure fluid directly from the source to the header when the load on the turbine or turbines exceeds a certain predetermined amount.

8. In combination, one or more high-pressure reciprocating engines, one or more low-pressure turbines receiving the exhaust therefrom, a shut-off valve for each turbine which closes the communication between it and the high-pressure reciprocating engine or engines when the speed of the turbine exceeds a certain predetermined amount, and a conduit that discharges the excess motive fluid when one or more of the shut-off valves close.

9. In combination, one or more high-pressure reciprocating engines, a header receiving the exhaust therefrom, one or more low-pressure turbines connected to and receiving motive fluid from the header, condensing apparatus connected to the turbine or turbines, and a conduit for admitting motive fluid to the turbine or turbines at a pressure above that of the header.

In witness whereof I have hereunto set my hand this 5th day of October, 1905.

WILLIAM L. R. EMMET.

Witnesses:
BENJAMIN B. HULL,
MARGARET E. WOOLLEY.